(12) United States Patent
Montoya et al.

(10) Patent No.: US 11,884,496 B2
(45) Date of Patent: *Jan. 30, 2024

(54) MANUFACTURING PICKUP TOOL

(71) Applicant: NIKE, Inc., Beaverton, OR (US)

(72) Inventors: Adam Montoya, Shepherdsville, KY (US); Raymundo Alatorre Mercado, San Jose, CA (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/361,695

(22) Filed: Jun. 29, 2021

(65) Prior Publication Data

US 2021/0323778 A1 Oct. 21, 2021

Related U.S. Application Data

(60) Continuation of application No. 16/460,652, filed on Jul. 2, 2019, now Pat. No. 11,078,033, which is a
(Continued)

(51) Int. Cl.
*B65G 47/91* (2006.01)
*B25J 15/00* (2006.01)
*B25J 15/06* (2006.01)
*B25J 19/02* (2006.01)
*B65G 51/00* (2006.01)

(52) U.S. Cl.
CPC ........ *B65G 47/917* (2013.01); *B25J 15/0052* (2013.01); *B25J 15/0625* (2013.01); *B25J 15/0658* (2013.01); *B25J 19/023* (2013.01); *B65G 47/918* (2013.01); *B65G 51/00* (2013.01)

(58) Field of Classification Search
None
See application file for complete search history.

(56) References Cited

U.S. PATENT DOCUMENTS 6,149,375 A * 11/2000 Hebrank .............. A01K 45/007
414/404
7,353,589 B2 * 4/2008 Kawasumi ......... H05K 13/0404
29/742
(Continued)

FOREIGN PATENT DOCUMENTS

CN 1229044 A 9/1999
CN 101148226 A 3/2008
(Continued)

*Primary Examiner* — Ronald P Jarrett
(74) *Attorney, Agent, or Firm* — Shook, Hardy & Bacon L.L.P.

(57) ABSTRACT

A vacuum powered pickup tool with mechanically moveable discrete nozzles allows for selective activation of the nozzles through the mechanical movement of the nozzles relative to a vacuum manifold. The movement of a nozzle from an inactive position where an inlet port of the nozzle is fluidly decoupled with the vacuum manifold to an active position where the inlet port is fluidly coupled with the vacuum manifold allows for independent activation of discrete nozzles of the pickup tool. Aspects also contemplate varying an associate manifold through movement of the manifolds accessible to the inlet port of the nozzle when in the active position.

15 Claims, 8 Drawing Sheets

Related U.S. Application Data division of application No. 15/365,381, filed on Nov. 30, 2016, now Pat. No. 10,392,201.

(60) Provisional application No. 62/261,702, filed on Dec. 1, 2015.

(56) References Cited

U.S. PATENT DOCUMENTS

| | | |
|---|---|---|
| 10,392,201 B2 | 8/2019 | Montoya et al. |
| 2002/0059945 A1 | 5/2002 | Maiefski et al. |
| 2009/0167294 A1 | 7/2009 | Beom et al. |
| 2014/0195053 A1 | 7/2014 | Subotincic |
| 2017/0152115 A1 | 6/2017 | Montoya et al. |
| 2019/0322468 A1 | 10/2019 | Montoya et al. |

FOREIGN PATENT DOCUMENTS

| | | |
|---|---|---|
| CN | 100469539 C | 3/2009 |
| CN | 101484987 A | 7/2009 |
| CN | 101918180 A | 12/2010 |
| CN | 102976099 A | 3/2013 |
| CN | 204624682 U | 9/2015 |
| DE | 29609486 U1 | 8/1996 |
| EP | 1514651 A1 | 3/2005 |
| JP | 55-61523 A | 5/1980 |
| JP | 59-79547 A | 5/1984 |
| JP | 60-135152 A | 7/1985 |
| JP | 63-76490 A | 4/1988 |
| JP | 6-238587 A | 8/1994 |
| JP | 2001-35862 A | 2/2001 |
| JP | 2002-192490 A | 7/2002 |
| JP | 2005-263481 A | 9/2005 |
| JP | 2006-224256 A | 8/2006 |
| JP | 2006-275595 A | 10/2006 |
| JP | 2007-30139 A | 2/2007 |
| TW | 200306905 A | 12/2003 |
| TW | I379376 B | 12/2012 |
| TW | 201320254 A | 5/2013 |
| TW | M550728 U | 10/2017 |
| WF | 201536654 A | 10/2015 |

* cited by examiner

MANUFACTURING PICKUP TOOL

CROSS-REFERENCE TO RELATED APPLICATIONS

This application is a continuation of U.S. application Ser. No. 16/460,652, entitled "Manufacturing Pickup Tool," and filed on Jul. 2, 2019, which is a division of U.S. application Ser. No. 15/365,381 entitled "Manufacturing Pickup Tool" and filed on Nov. 30, 2016, which claims the benefit of U.S. Provisional Application No. 62/261,702, entitled "Manufacturing Pickup Tool," and filed Dec. 1, 2015. The entirety of each of the aforementioned applications is incorporated by reference herein.

TECHNICAL FIELD

Aspects provide methods and systems for selectively activating portions of a pickup tool for movement of a component in a manufacturing environment.

BACKGROUND

Manufacturing of articles may include the use of multiple discrete components having varying sizes and dimensions. The various components may be provided in a common manufacturing setting such that common tooling is used on the various components regardless of shape and size. As such, a general tool, such as a general pickup tool, that can be used in connection with the variety of components may be selected for the manufacturing setting to provide flexibility in the manufacturing setting. However, a general tool when used with varying components may introduce inefficiencies and unintended interactions because the tool is general in nature and not adapted for each of the components.

BRIEF SUMMARY

Aspects hereof provide systems and methods for a pickup tool having individually activated nozzles. The activation of the nozzles may include individually mechanically positioning the nozzles in an active position relative to a vacuum manifold and an inactive position relative to the vacuum manifold. For example, a linear actuator using pneumatic or electronic drive may linearly move the nozzle in a longitudinal direction such that the nozzle slides through the vacuum manifold from an active position that allows for vacuum pressure to pass through the nozzle to an inactive position that prevents the negative pressure within the vacuum manifold from passing through the nozzle. Each of the nozzles may be individually positioned in active and inactive positions to control which nozzles are providing vacuum pressure for picking up a component. Another aspect further contemplates the vacuum manifold and another manifold, such as a positive pressure manifold, moving in the longitudinal direction such that when a nozzle is in an active position, the manifold providing positive or negative pressure may be changed by the linear movement of the manifolds, in an exemplary aspect. Therefore, it is contemplated that a pickup tool may have individually activated nozzles by linearly moving each nozzle relative to a manifold and the manifold that the nozzles move relative to may be changed to adjust a type/amount of pressure presented to the nozzle(s).

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figure 1:
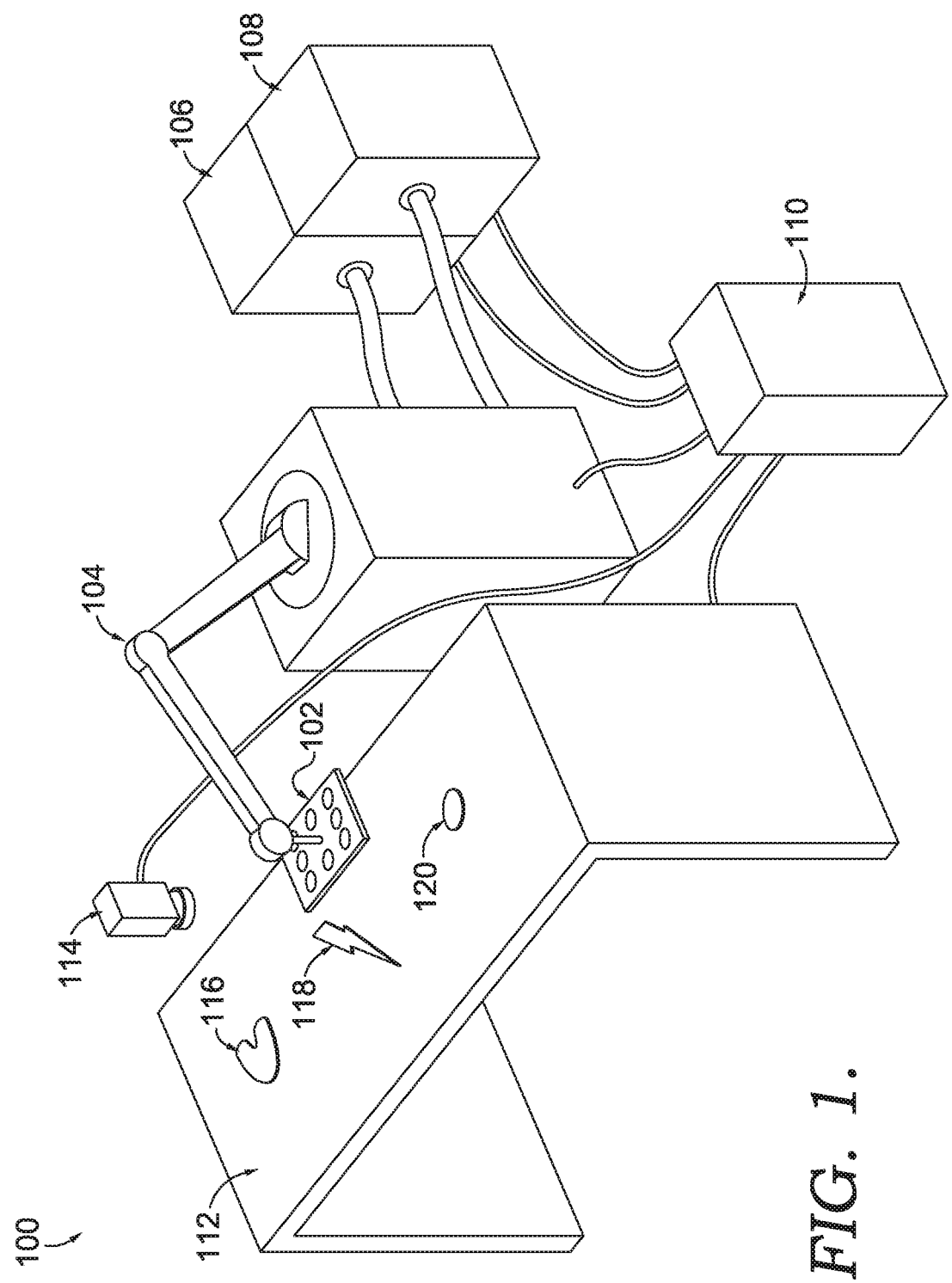
FIG. 1 depicts an exemplary system comprised of a pickup tool, a multi-axis movement mechanism, a vacuum source, a positive pressure source, a computing device, a vision system, and an exemplary process surface, in accordance with aspects hereof.

Manufacturing of articles, such as articles of footwear or articles of apparel, may use a variety of discrete components having different characteristics (e.g., material, shape, size). Each of these different components may benefit from a different pickup tool configuration for more efficient movement and placing. However, having discretely different pickup tools for each of the components may introduce inefficiencies in the manufacturing process as the discrete pickup tools are exchanged or from a tooling cost perspective. Therefore, aspects hereof contemplate a configurable pickup tool that is configured to active discrete regions or nozzles from a plurality of regions or nozzles. The activated regions or nozzles may be configured for the unique component to be manipulated by the selectively activated portions of the pickup tool, as will be provided hereinafter in greater detail.

At a high level, a pickup tool herein is contemplated to have individually activated nozzles forming the pickup tool. The activation of the nozzles may include mechanically positioning the nozzle in an active position relative to a vacuum manifold and an inactive position relative to the vacuum manifold. For example, a linear actuator using pneumatic or electronic drive may linearly move the nozzle in a longitudinal direction such that the nozzle slides through the vacuum manifold from an active position that allows for vacuum pressure to pass through the nozzle to an inactive position that prevent the negative pressure within the vacuum manifold from passing through the nozzle. Each of the nozzles may be individually positioned in active and inactive positions to control which nozzles are providing vacuum pressure for picking up a component. Another aspect further contemplates the vacuum manifold and another manifold, such as a positive pressure manifold, moving in the longitudinal direction such that when a nozzle is in an active position, the manifold providing positive or negative pressure may be changed by the linear movement of the manifolds, in an exemplary aspect. Therefore, it is contemplated that a pickup tool may have individually activated nozzles by linearly moving each nozzle relative to a manifold and the manifold that the nozzles move relative to may be changed to adjust a type/amount of pressure presented to the nozzle(s).

For example, an exemplary pickup tool may be comprised of a base member; a first movement mechanism coupled with the base member and a second movement mechanism coupled with the base member. The first movement mechanism and the second movement mechanism are independently controllable. The pickup tool is further comprised of a vacuum manifold that is coupled, fixedly or moveably, with the base member and comprised of a first sleeve and a second sleeve extending through the vacuum manifold. The first sleeve is comprised of a first sleeve port and the second sleeve is comprised of a second sleeve port such that the first sleeve port and the second sleeve port are apertures that extend through the first sleeve and the second sleeve, respectively, and fluidly connect an internal volume of the vacuum manifold with the first sleeve and the second sleeve, respectively. The pickup tool is further comprised of a first nozzle having a first inlet port fluidly connected with a first pressure port of the first nozzle. The first nozzle is physically connected with the first movement mechanism and slidably moveable in a longitudinal direction within the first sleeve and the first nozzle is configured to be positioned at an active position and an inactive position within the first sleeve by the first movement mechanism. The pickup tool is also comprised of a second nozzle having a second inlet port fluidly connected with a second pressure port of the second nozzle. The second nozzle is coupled with the second movement mechanism and slidably moveable within the second sleeve and the second nozzle is configured to be positioned at an active position and an inactive position by the second movement mechanism within the second sleeve.

With a broader perspective, aspects herein provides for a material pickup system that includes a computing device; a vacuum source; a multi-axis movement device logically coupled with the computing device; and a pickup tool logically coupled with the computing device. The pickup tool includes a plurality of independently activated nozzles and a plurality of nozzle movement mechanisms. Each of the plurality of independently activated nozzles is coupled with a discrete nozzle movement mechanism of the plurality of nozzle movement mechanism. The pickup tool is also comprised of a vacuum manifold that is fluidly coupled with the vacuum source. Each of the plurality of independently activated nozzles slidably extends through respective manifold sleeves of the vacuum manifold. As a nozzle slides within a manifold sleeve by a force applied, in part, by a nozzle movement mechanism, the nozzle can change positions between an active position where the pressure (e.g., negative pressure) of the vacuum manifold is fluidly transmitted to the nozzle allowing the nozzle to use that pressure as a pickup tool and an inactive position where the pressure of the vacuum manifold is not transmitted through the nozzle.

Further yet, methods are contemplated herein for moving material with a pickup tool. The method includes moving a nozzle of a plurality of nozzles relative to a vacuum manifold of the pickup tool to fluidly couple an inlet port of the first nozzle with a sleeve port of the vacuum manifold. This movement allows for pressure within the vacuum manifold to be transmitted through the nozzle to a component to be picked up by the pickup tool. The method continues with positioning the pickup tool proximate the first component such that the first nozzle is positioned proximate a component at a first location to be picked up by the pickup tool and moving the component as maintained to the pickup tool by at least the first nozzle. The method further includes placing the component at a second location and moving the first nozzle relative to the vacuum manifold to fluidly decouple the inlet port from the sleeve port. The decoupling prohibits the transmission of the internal pressure of the vacuum manifold through the nozzle, which can effectively stop a continued vacuum force at the nozzle interface with the component. The method may optionally include moving a positive manifold relative to the nozzle such that the inlet port of the nozzle is in fluid communication with a positive sleeve port of the positive manifold. In this step, a positive pressure may be transmitted from the positive manifold through the nozzle to dislodge the component from the nozzle, such as through a blowing off action. The positive manifold, in this example, is coupled with the vacuum manifold such that the positive manifold and the negative manifold move in cooperation relative to the nozzle.

Additional aspects will be provided herein. For example, FIG. 1 depicts an exemplary system 100 comprised of a pickup tool 102, a multi-axis movement mechanism 104, a vacuum source 106, a positive pressure source 108, a computing device 110, a vision system 114, and an exemplary process surface 112, in accordance with aspects hereof. Additionally depicted are a plurality of varied exemplary components, such as component 116, component 118, and component 120. While a variety of devices, elements, and components are depicted in FIG. 1, it is contemplated that additional devices, elements, and components may be implemented in alternative aspects. Further, it is contemplated that one or more of the devices, elements, and components may be omitted altogether. Further yet, it is contemplated that any combination and/or number of devices, elements, and components may be utilized in exemplary aspects hereof. Therefore, FIG. 1 is illustrative and not intended to be limiting in nature.

The pickup tool 102 is depicted in a simplified form for illustration purposes and will be explained in greater detail with respect to FIGS. 2-7D hereinafter. However, at a high level, the pickup tool 102 provides a plurality of individually controllable zones, which may be defined by individually controllable nozzles representing each zone. However, a grouping of nozzles may represent a particular zone and while each nozzle within a given zone can be independently activated in some aspects, it is also contemplated that a grouping of nozzles forming a zone may be activated in cooperation, such as through a common nozzle movement mechanism, in an exemplary aspect. Examples provided hereinafter refer to individually controlled nozzles, but it is understood that groupings of elements are also contemplated.

The multi-axis movement mechanism 104 may be a robotic arm having a variety of degrees of motion and/or rotation. For example, a 2, 3, 4, 5, 6, 7 degrees of freedom multi-axis movement mechanism may be coupled with the pickup tool 102 to position the pickup tool 102 in a particular location of the working environment to pick up and place a component. For example, the multi-axis movement mechanism 104 may be logically coupled with the computing device 110 to receive one or more instructions (or to provide one or more feedback indications) to appropriately position the pickup tool 102.

The vacuum source 106 is a vacuum generating device capable of creating a negative pressure that is fluidly coupled with the pickup tool 102, such as through flexible tubing that provides flexibility to the movement and positioning of the pickup tool 102 by the multi-axis movement mechanism 104. Vacuum generating devices may generate a negative pressure (e.g., vacuum) through a variety of means, such as coanda effect, venture effect, powered decompressors (e.g., electric, pneumatic, hydraulic powered), and the like. It is contemplated that the vacuum source 106 is logically coupled, in an exemplary aspect, with the computing device 110 to control the amount of vacuum, the presence of vacuum, and the like. For example, as vacuum pressure needs change, the computing device may control an amount of vacuum pressure generated. Additionally, it is contemplated that as the presence (e.g., on/off) of vacuum pressure changes, the computing device 110 may provide appropriate instructions to control the vacuum source 106, in an exemplary aspect.

The positive pressure source 108 is a pressure generator, such as a compressor. The positive pressure source 108 is fluidly coupled with the pickup tool 102 to provide a positive air pressure (e.g., compressed air). The positive pressure may be used at the pickup tool 102 to activate one or more pneumatic movement mechanisms (e.g., pneumatic actuators). The positive pressure may alternatively or additionally be used to provide positive pressure to a positive manifold for application of pressurized air through one or more nozzles to cause a blow off effect, as will be provided hereinafter. It is contemplated that the positive pressure source 108 is logically coupled with the computing device 110 to control the distribution of positive pressure. For example, one or more valves may be associated with the positive pressure source 108 that allow for individual control of one or more unique movement mechanisms, such as nozzle movement mechanisms and/or manifold movement mechanisms. Additionally or alternatively, it is contemplated that the controlling valves may be associated with an alternative device, such the pickup tool 102 for the individual control of one or more movement mechanisms. Further, it is contemplated that the positive pressure source 108 does not provide power for one or more movement mechanisms, but instead serves as a positive pressure source for an optional positive manifold or it is omitted altogether, in some aspects.

The computing device 110 has a processor and memory and is functional to provide instructions, receive information, access information, and process the received and accessed information. As such, it is contemplated that the computing device 110 is logically coupled either wired or wirelessly to one or more of the elements of the system 100. For example, the computing device may be couple with the vision system 114 to identify an orientation and identification of a component. The computing device 110 may then instruct the pickup tool 102 to activate one or more nozzles effective to pick up or otherwise manipulate the identified component. The computing device 110 may also instruct the multi-axis movement mechanism 104 to position the pickup tool 102 in one or more locations. Further, it is contemplated that computing device 110 may coordinate said actions to accomplish the movement, pick, and place of a component with the pickup tool 102.

The computing device 110 may include a variety of computer-readable media. Computer-readable media can be any available media that can be accessed by computing device 110 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data.

Computer storage media includes non-transitory RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

The computing device 110 may include computer-readable media having instruction embodied thereon that are effective to cause one or more elements of the system 100 to perform one or more actions. For example, the instructions may cause a movement mechanism to move, a multi-axis movement device to move, a camera to capture an image, a register to register a position of the material, and a processes station to perform an operation, in an exemplary aspect.

The process surface 112 is a surface on which a component may be accessed by the pickup tool 102. For example, it is contemplated that the process surface 112 is a conveyance surface, such as a conveyor belt. For example, a component may move along the process surface 112 within a capture area of the vision system 114 to identify a relative orientation, position, and potential identification of the component. The component may continue to advance along the process surface 112 to a workable zone accessible by the pickup tool 102 that may then pick up the component for additional processing (e.g., movement to a different location, positioning relative to another component, and/or repositioning/orienting the component).

The vision system 114 is effective to capture an image. For example, the vision system may be a camera capable of capturing an image of one or more components. The image may be communicated to a computing device, such as the computing device 110. The image may then be analyzed by the computing device. The analysis may determine an identification of the component, an orientation of the component, and/or a position of the component. These determinations may then be used in connection with stored information to determine an appropriate action for the pickup tool 102. For example, a determination as to which nozzles to active/deactivate, a position of the pickup tool 102 to be placed by the multi-axis movement mechanism 104, and position to place the component once secured by the pickup tool 102, in an exemplary aspect.

The component 116, component 118, and component 120 are exemplary in nature. These components may be portions of materials, rigid or flexibly, that are used in the formation of an article, such as an article of footwear. The components may be of any size, shape, material, and orientation. For example, as depicted, each of the components 116, 118, and 120 have a different shape and size. The pickup tool 102 may activate different nozzles thereon in response to the shape and size of each of the components. This selective activation of nozzles may prevent excess vacuum pressure use and/or unintentional adhesion of elements to the pickup tool other than a target component, for example.

The components may be made of any material, such as knit, woven, film, sheet, leather, mesh, non-woven, and the like. For example, a first component may be formed from a porous mesh-like material and a second component may be formed from a polymer film. The mesh-like material may be more difficult to maintain with vacuum pressure than the non-porous polymer film; therefore, a different nozzle configuration may be selected based on the component material (e.g., more nozzles may be activated for the mesh-like material than the non-porous film).

As previously provided, the components, elements, and devices of system 100 are illustrative in nature and are not limiting. Additional and/or alternative components, elements, and device may be implemented. For example multiple vision systems, multiple pickup tools, multiple computing devices, and/or multiple vacuum/pressure sources may be used in exemplary aspects. Further, one or more components, elements, and/or devices may be omitted in exemplary aspects.

Figure 2:
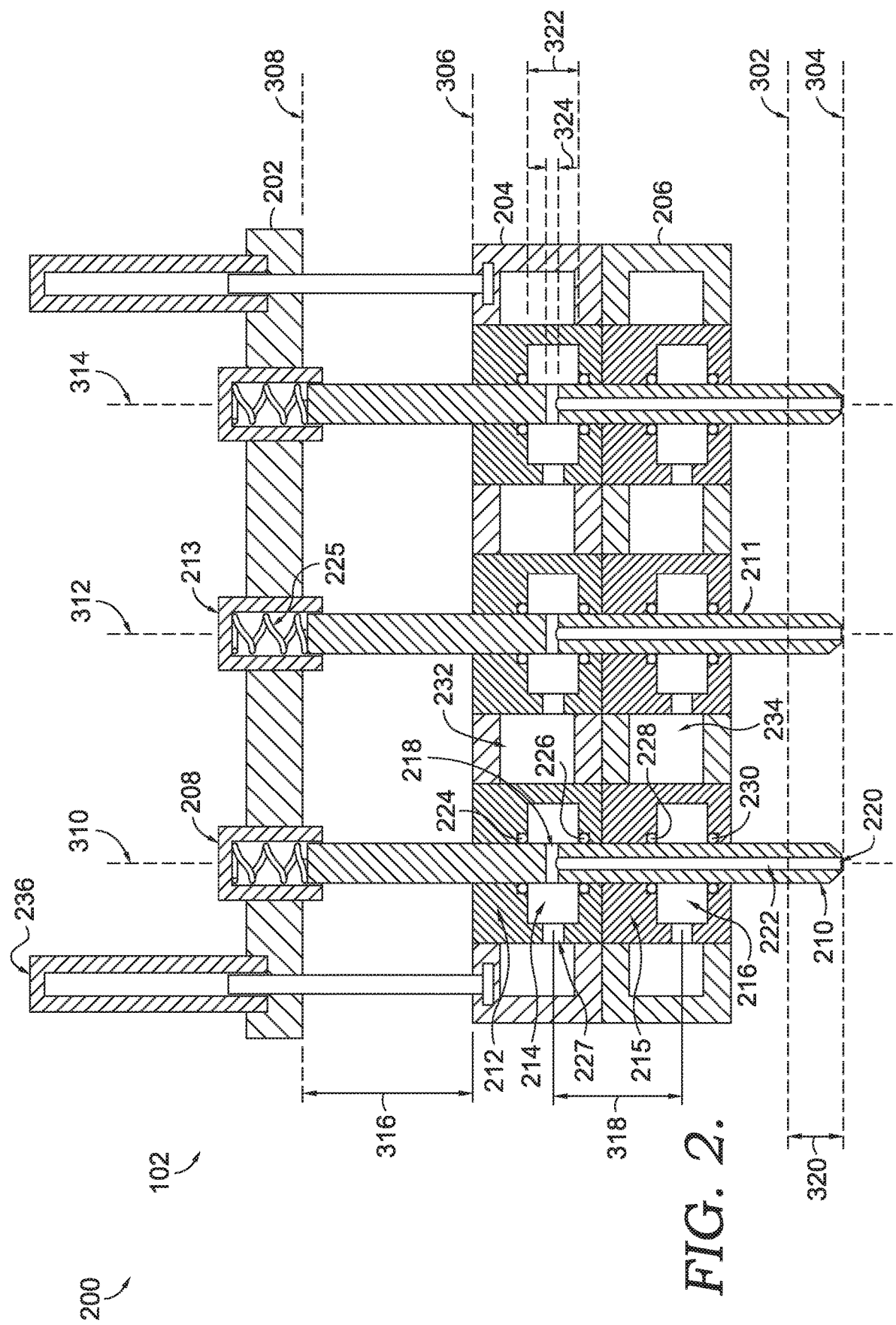
FIG. 2 depicts a cross section view of the pickup tool of FIG. 1 having the illustrated nozzles in active positions relative to the vacuum manifold, in accordance with aspects hereof.
Figure 3:
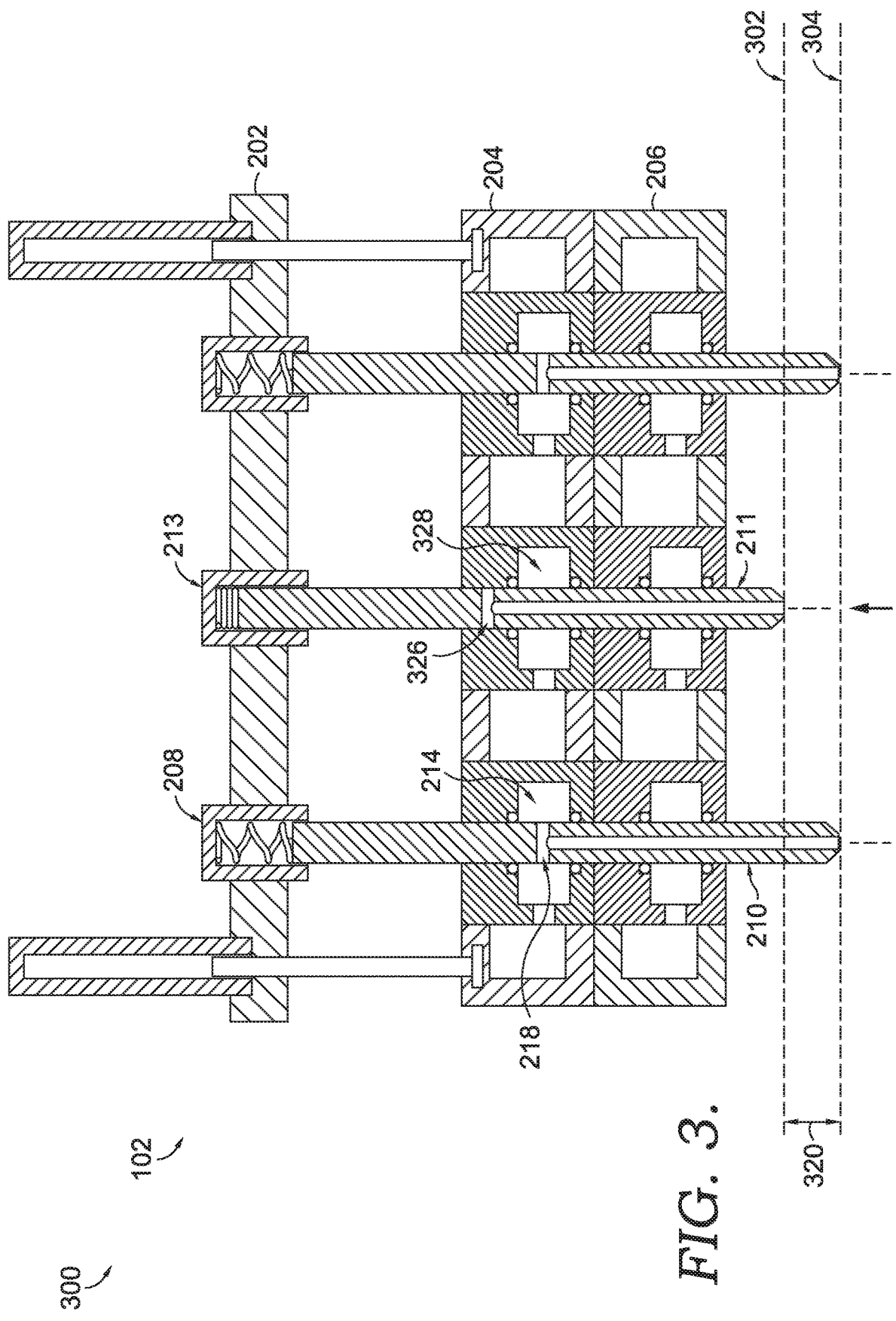
FIG. 3 depicts a cross sectional view of the pickup tool of FIG. 1 having the first nozzle in an active position and the second nozzle in an inactive position relative to the vacuum manifold, in accordance with aspects hereof.
Figure 4:
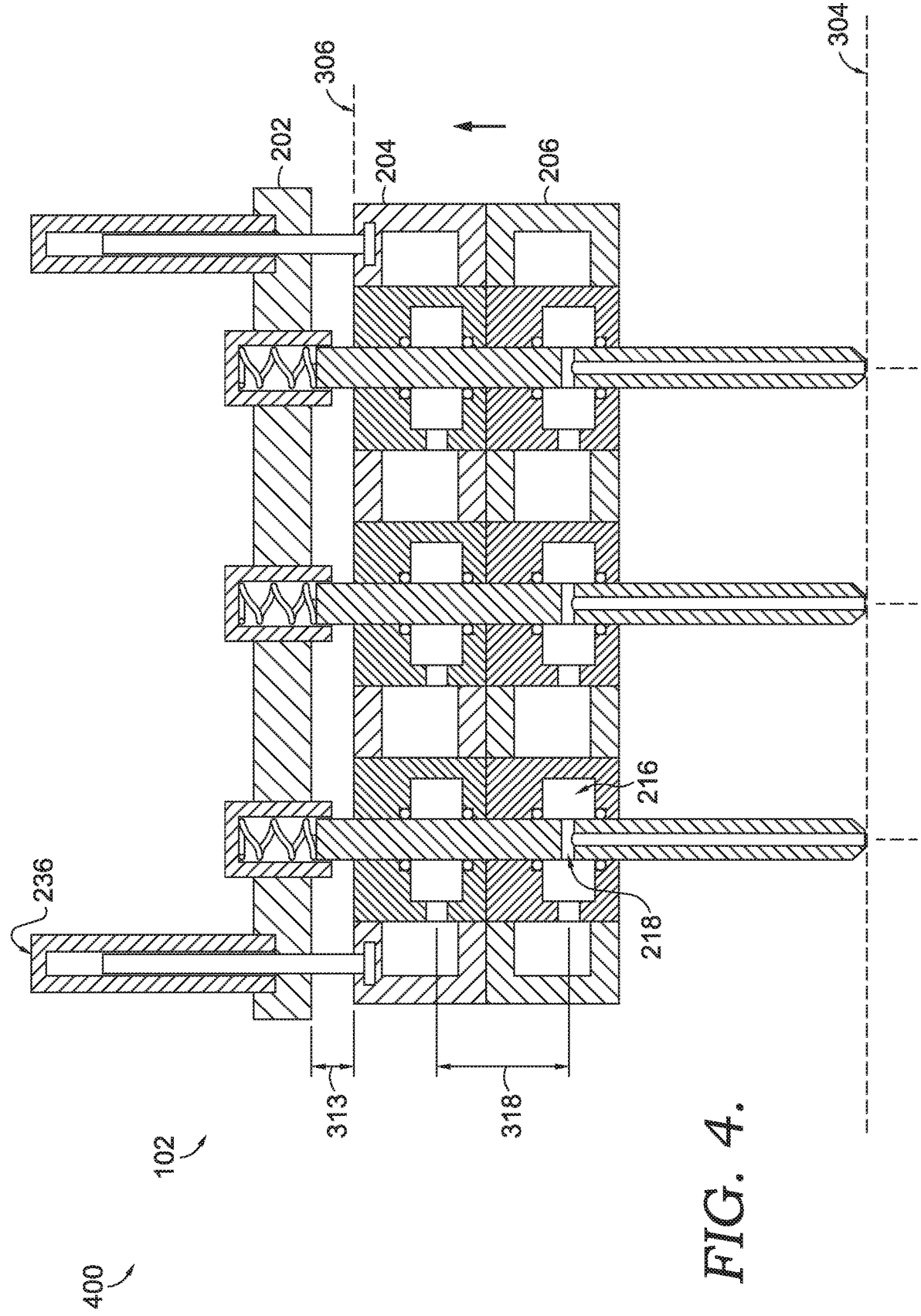
FIG. 4 depicts a cross sectional view of the pickup tool of FIG. 1 having the first nozzle in an active position and the second nozzle also in an active position relative to the positive manifold, in accordance with aspects hereof.
Figure 5:
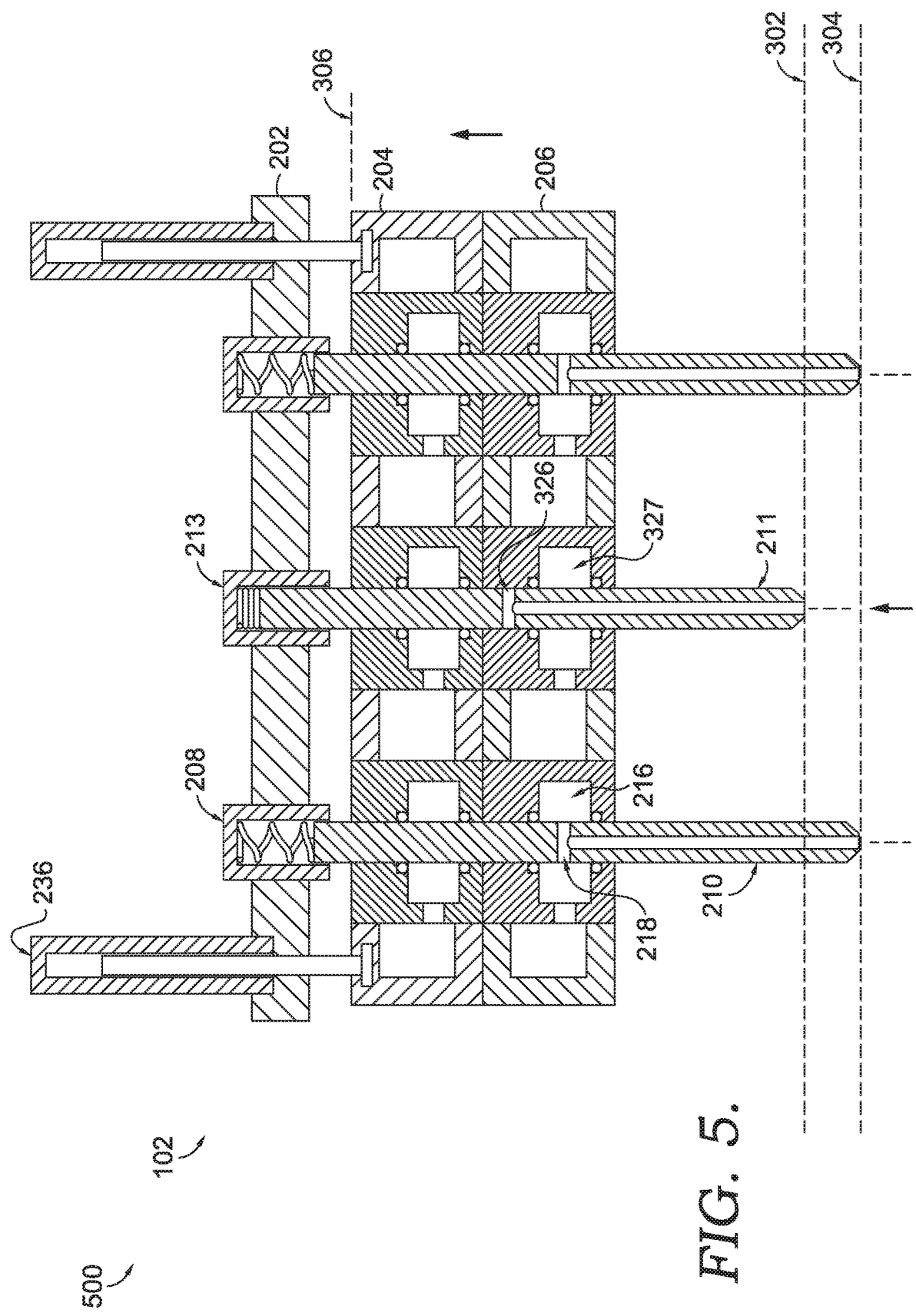
FIG. 5 depicts a cross sectional view of the pickup tool of FIG. 1 having the first nozzle in an active position and the second nozzle in an inactive position relative to the positive manifold, in accordance with aspects hereof.

FIGS. 2-5 illustrate various configurations of the pickup tool 102 of FIG. 1, in accordance with aspects hereof. For example, FIGS. 2 and 3 depict the pickup tool 102 having nozzles in various states of inactive and active positioning relative to a first manifold, such as a vacuum manifold 204. FIGS. 4 and 5 depict the pickup tool 102 having nozzles in various states of inactive and active positioning relative to a second manifold, such as a positive manifold 206. As such, it is illustrated how the pickup tool 102 is configured to independently activate nozzles with a linear movement through one or more manifolds while changing the manifold to which the nozzles are able to fluidly couple. While two manifolds are depicted in FIGS. 2-5, it is understood that aspects hereof contemplate a single manifold without additional manifold options. For example, it is contemplated that a first pressure source (e.g., vacuum pressure) and a second pressure source (e.g., positive pressure) may be coupled with a common manifold and the pressure of the manifold may be changed without changing the manifold that the nozzles may be in fluid communication herewith by changing the pressure source to the manifold. Therefore, while not depicted, it is contemplated that a single manifold configuration may be implemented.

While a plurality of nozzles are depicted in FIGS. 1-7D, aspects herein include a single nozzle and not a plurality of nozzles. For example, a unitary nozzle may be implemented in an exemplary aspect. Further, it is contemplated that at a basic level, a single nozzle and a single nozzle movement mechanisms may be used in connection with one or more manifolds to achieve aspects hereof. Therefore, while the illustrated examples depict a plurality of nozzles, it is contemplated that a single nozzle that mechanically moves to fluidly couple and decouple with a manifold may be implemented to achieve aspects contemplated herein.

FIG. 2 depicts a cross section view 200 of the pickup tool 102 having the illustrated nozzles in active positions relative to the vacuum manifold 204, in accordance with aspects hereof. The pickup tool 102 is comprised of a base plate 202, a vacuum manifold 204, a positive manifold 206, a first nozzle movement mechanism 208, a first nozzle 210, a first sleeve 212, a first sleeve port 214, a second sleeve 215, a positive sleeve port 216, an inlet port 218, a pressure port 220, a pressure channel 222, seals 224, 226, 228, 230, a vacuum manifold internal volume 232 and a positive manifold internal volume 234, a manifold movement mechanism 236, a second nozzle 211, and a second nozzle movement mechanism 213.

The pickup tool 102 is illustrated for discussion purposes. It is contemplated that alternative features/elements, combinations of features/elements, numbers of features/elements, and positions of features/elements may be implemented. For example, only three nozzles are depicted in FIG. 2, however, it is contemplated that any number of nozzles may be implemented within the scope of aspects contemplated. For example, a first pickup tool may have 255 nozzles, a second pickup tool may have 100 nozzles, a third pickup tool may have 50 nozzles, a fourth tool may have 20 nozzles, a fifth pickup tool may have 10 nozzles, and a sixth tool may have 2 nozzles. Further to that, it is contemplated that any number of nozzles may be implemented in any configuration, as will be explored in FIGS. 7A-7D hereinafter. Similarly, it is contemplated that any number of movement mechanisms may be implemented, such as discrete nozzle movement mechanisms per nozzle or several nozzles coupled with a common nozzle movement mechanism. Additionally, as already discussed herein, it is contemplated that a single manifold is implemented in a pickup tool. So, while two discrete manifolds are provided in FIGS. 2-6, a unitary manifold configuration is also contemplated. The number and existence of manifold movement mechanisms may also be adjusted based on the size and number of manifolds. For example, when a single manifold configuration is implemented, the manifold movement mechanism may be omitted altogether. Therefore, the elements and features of the pickup tool 102 are exemplary in nature and are not limiting to the scope contemplated herein.

The base plate 202 is an anchor element to which one or more movement mechanisms are secured. For example, the first nozzle movement mechanism 208 is secured to the base plate 202, such as threadably secured there through. The manifold movement mechanism 236 is also depicted as being secure to the base plate 202. As depicted, the movement mechanisms extend through the base plate 202 from a top surface to a bottom surface; however, it is contemplated that a movement mechanism may be secured to the bottom surface of the base plate 202 in an exemplary aspect. Further, while the base plate 202 is depicted as a discrete and separate piece from the vacuum manifold 204, in an exemplary aspect the base plate 202 and the vacuum manifold 204 may be a singular element or rigidly coupled together. Further, while an offset distance 316 is depicted there between, the offset distance 316 may be any distance including an abutment of the base plate 202 bottom surface with the vacuum manifold 204, in an exemplary aspect. The base plate 202 may be formed from any material, such as a metallic material (e.g., aluminum, steel, magnesium), a polymer-based material (e.g., polystyrene, vinyl, polyethylene, polypropylene, polyethylene terephthalate, polyvinyl chloride) composite (e.g., fiber reinforced materials), and the like. Further, the base plate may be formed from milling, molding, additive manufacturing (e.g., deposition, sintering) and/or the like.

The base plate 202 may also serve, directly or indirectly, as a connection point with the multi-axis movement mechanism 104 of FIG. 1. For example, a mounting bracket may be removably secured or integrally formed with the base plate 202 for securing the pickup tool 102 to the multi-axis movement mechanism 104 of FIG. 1, for example.

The vacuum manifold 204 provides a structure through which a plurality of nozzles slideable move and provides the internal volume 232 that maintains an air pressure, such as a negative air pressure (i.e., a vacuum pressure). As such, the vacuum manifold 204 provides structural support for maintaining the axial alignment (e.g., longitudinal axis 310, 312, and 314) of the plurality of nozzles as they slide through the vacuum manifold 204. Additionally, the vacuum manifold 204 provides structural support to resist deformation from the pressure of the internal volume 232, such as a contracting deformation provided by a negative pressure or an expanding deformation provided by a positive pressure.

The vacuum manifold 204 may be formed from any material, such as a metallic material, a polymer-based material, and/or a composite material. Additionally, it is contemplated that the vacuum manifold is formed from a variety of manufacturing techniques, such as milling, molding, and/or additive manufacturing. For example, in an exemplary aspect, the vacuum manifold is formed from an additive process, such as laser sintering, to form the complex internal geometries of the vacuum sleeve and sleeve ports. For example, because the vacuum manifold may be formed with internal elements (e.g., the sleeves) of an enclosed volume (e.g., internal volume 232), additive manufacturing allows for the building of those geometries while still achieving an enclosed volume effective to maintain an air pressure (e.g., positive or negative). However, it is also contemplated that the vacuum manifold 204 may be formed from separate elements and assembled to achieve the internal elements, in an exemplary aspect.

The positive manifold 206 provides a structure through which a plurality of nozzles slideable move and provides the internal volume 234 for maintaining an air pressure, such as a positive air pressure (i.e., a compressed air pressure). As such, the positive manifold 206 provides structural support for maintaining the axial alignment (e.g., longitudinal axis 310, 312, and 314) of the plurality of nozzles as they slide through the positive manifold 206. Additionally, the positive manifold 206 provides structural support to resist deformation from the pressure of the internal volume 234, such as a contracting deformation provided by a negative pressure or an expanding deformation provided by a positive pressure.

The positive manifold 206 may be formed from any material, such as a metallic material, a polymer-based material, and/or a composite material. Additionally, it is contemplated that the positive manifold 206 is formed from a variety of manufacturing techniques, such as milling, molding, and/or additive manufacturing. For example, in an exemplary aspect, the positive manifold 206 is formed from an additive process, such as laser sintering, to form the complex internal geometries of the positive sleeves and sleeve ports. For example, because the positive manifold 206 may be formed with internal elements (e.g., the sleeves) of an enclosed volume (e.g., internal volume 234), additive manufacturing may be used for building of those geometries while still achieving an enclosed volume effective to maintain an air pressure (e.g., positive or negative). However, it is also contemplated that the positive manifold 206 may be formed from separate elements and assembled to achieve the internal elements, in an exemplary aspect.

If two or more manifolds are used in conjunction with a pickup tool, it is contemplated that the first manifold (e.g., vacuum manifold 204) and the second manifold (e.g., positive manifold 206) have axially aligned sleeves allowing for the axial movement of a nozzle through both manifolds. For example, the vacuum manifold 204 has the first sleeve 212 that surrounds a circumference of the first nozzle 210 and allows for the first nozzle 210 to slide along the longitudinal axis 310 through the vacuum manifold 204. The positive manifold 206 includes a complimentary second sleeve 215 that also surrounds the circumference of the first nozzle 210 and allows for the first nozzle 210 to slide along the longitudinal axis 310 through the positive manifold 206. Stated differently, the vacuum manifold 204 and the positive manifold 206 are positioned relative to each other to allow for the longitudinal movement of a nozzle through both manifolds.

A nozzle, such as the first nozzle 210, is effective to transmit air pressure (e.g., positive or negative) from a manifold to a part-contacting surface of the nozzle, such as a surface at the pressure port 220 of the first nozzle 210. The nozzle is comprised of an inlet port, such as the inlet port 218, that extends from an exterior surface of the nozzle toward an internal channel connected with the pressure port. For example, the first nozzle 210 has the inlet port 218 extending in a direction substantially perpendicular to the longitudinal axis to the pressure channel 222 that terminates in the pressure port 220 at a part-contacting surface of the first nozzle 210. The inlet port, pressure channel, and pressure port are effective to fluidly couple an internal volume of a manifold with an exterior location at the part-contacting surface of the nozzle.

The nozzle(s) may be formed from any material, such as a metallic or polymer-based material. Further, it is contemplated that the nozzle may be formed from a plurality of materials, such as a rigid material forming a longitudinal shaft and a part-contacting surface formed from a pliable and adaptable material to form a seal at the pressure port 220 to effectively adhere a component thereto. A size of the nozzle in a longitudinal direction may range from 5 millimeters ("mm") to 400 mm in exemplary aspects. A diameter of a nozzle may range from 1 mm to 40 mm in an exemplary aspect.

A nozzle movement mechanism, such as the first nozzle movement mechanism 208 and the second nozzle movement mechanism 213, may be any movement mechanism, such as a linear actuator. A linear actuator is capable of moving the nozzle in a linear direction, such as in a direction aligned with the longitudinal axis 312 of the first nozzle 210. A linear actuator may be powered by a variety of means, such as an electric motor (e.g., converting rotational movement to linear movement through a threaded rotation of a shaft), pneumatic energy (e.g., pressurized gas driving a piston within an appropriately sized cylinder), hydraulic energy (e.g., pressurized liquid driving a piston within an appropriately sized cylinder), and the like. Therefore, it is contemplated that a nozzle movement mechanism is effective to position a nozzle in at least two positions, such as an active position (e.g., represented by a plane 304) and in an inactive position (e.g., represented by a plane 302 and as best seen in FIG. 2). As will be discussed herein, the linear movement of the nozzle between at least the active and inactive positions allows for the fluid coupling and decoupling of the nozzle with a selected manifold.

The nozzle movement mechanisms in FIG. 2 are illustrated in basic terms for ease of understanding. As such, it is contemplated in reality that one or more additional details exists, such as a piston and cylinder, a motor and threaded rod, or other components effective to translate a supplied power into a movement able to manipulate a position of a connected nozzle. Further, the first nozzle movement mechanism 208 and the second nozzle movement mechanism 213 are depicted as having a biasing element 225 (e.g., spring) that resists the movement of the nozzle into the active position such that when a supplied power source (e.g., pressurized air in the case of a pneumatic movement mechanism) is withdrawn, the biasing element returns the nozzle to an inactive state. This natural tendency to be in an inactive state allows for pressure within the manifold positioned for fluid coupling with nozzle to be maintained even if the power supply to the nozzle movement mechanisms is interrupted (e.g., an air supply line to a pneumatic actuator ruptures or an air-supply valve malfunctions). While a spring biasing member is depicted, it is contemplated that any biasing member may be implemented or omitted altogether. For example, a dual direction movement mechanism may be used that actively moves in both a first direction and an opposite second direction with active power supplied (e.g., forward and reverse linear actuation motion).

As will be provided in greater detail hereinafter, a distance of movement provided by a nozzle movement mechanism is at least an amount sufficient to position an inlet port within a sleeve port for fluidly coupling the nozzle with the associate manifold and to position the inlet port outside of the sleeve port to fluidly decouple the nozzle from the associated manifold. For example, the first sleeve port 214 has a longitudinal length represented by distance 322. In order to ensure a decoupling of the first nozzle 210 from the first sleeve port 214, the inlet port 218 is moved a distance 320 that moves the inlet port 218 outside of the sleeve port as sealed by ring seals 224 and 226, in this example. However, it is contemplated that the distance 320 of movement between an active and an inactive position may be less than the distance 322. For example, the inlet port 218 may move from adjacent sides of a seal, e.g., seal 224, to transition from an active to an inactive position, in an exemplary aspect. For example, the inlet port may have a diameter represented by a distance 324 and in this example the total movement of the nozzle is at least the distance 324 to ensure a complete fluid coupling and decoupling. Therefore, the throw distance, or distance of movement supplied by a nozzle movement mechanism is at least a sufficient amount to move an inlet port from a first side of a seal forming a sleeve port and an opposite second side of the seal forming the sleeve port.

A sleeve, such as the first sleeve 212, is a structure extending through a manifold that guides the movement of a nozzle extending there through and also provides a sealed region including a sleeve port, such as the first sleeve port 214 as sealed by the seals 224, 226. As a result, the sleeve provides for the linear movement and lateral support of a nozzle through a manifold thickness. A sleeve may be shaped and sized to surround an outer surface of a nozzle while allowing for the slideable movement of the nozzle through the sleeve and for allowing of a seal to be formed to limit leakage between the nozzle and the sleeve. In an exemplary aspect a sleeve is a cylinder shape extending through the manifold and includes an air passage through the sleeve to fluidly couple the internal volume of the manifold (e.g., internal volume 232) with the sleeve port (e.g., first sleeve port 214). The fluid connection between the manifold and the sleeve port by way of the air passage extending through the sleeve allows for the transmission of fluid from the manifold to the pressure port of one or more nozzles in the active position, in an exemplary aspect.

A sleeve may be a discrete structure extending through the manifold as depicted in FIGS. 2-5. Alternatively, the sleeve may be formed from a top surface and a bottom surface of the manifold through which the nozzle extends. For example, an aperture on the top surface and an axially aligned aperture on a bottom surface of a manifold may be sized to receive and allow a sealed and slideable movement of a nozzle there through while still supporting and guiding the movement of the nozzle. Therefore, in this simplified example, the sleeve port is also the internal volume of the manifold such that an active position includes having a nozzle inlet port positioned within the manifold internal volume and an inactive position includes that the nozzle inlet port outside of the manifold internal volume, in an exemplary aspect. Therefore, it is contemplated that a variety of structures may be implemented to achieve the coupling and decoupling of a nozzle with a manifold.

In an optional aspect, the pickup tool 102 is comprised of two manifold having different pressure characteristics. For example, the vacuum manifold 204 may contain a negative pressure that is effective to create a suction effect at the pressure port of the nozzles, and the positive manifold 206 may contain a positive pressure that is effective to create a blow off effect at the pressure port of the nozzles, in an example. To transition the pickup tool between the vacuum manifold 204 and the positive manifold 206, the manifold movement mechanism 236 collectively moves the manifolds. The collective movement of the manifold positions a requested manifold within a region allowing for the nozzles to change between an active and in active position for the selected manifold. Stated differently, the nozzles continue to only move between the plane 304 and the plane 302 to fluidly couple and decouple from an appropriately positioned manifold. To change which manifold is the appropriately positioned manifold, the manifold movement mechanism 236 linearly positions the manifolds relative to the base plate 202. As seen in FIGS. 2 and 3 the offset distance 316 is maintained between the bottom surface of the base plate 202, as represented by plane 308, and the top surface of the vacuum manifold 204 as represented by plane 306. When the positive manifold 206 is appropriately positioned to be fluidly coupled with the nozzles of the pickup tool 102, as depicted in FIGS. 4 and 5, a distance 313 is provided between the base plate 202 and the plane 306. With the movement of the manifolds relative to the base plate 202, the part contacting surface position for the nozzles remains constant when in the active position as depicted by the plane 304. Therefore, a component may be adhered to one or more active nozzles with the vacuum manifold 204 appropriately positioned and the component may be blown off of the one or more active nozzles by linearly moving the manifold via the manifold movement mechanism 236 until the positive manifold 206 is appropriately positioned to fluidly couple with the still actively positioned nozzles, in an example.

The manifold movement mechanism 236 may be a linear actuator. As previously provided, the linear actuator may be powered by a variety of means, such as electric power, pneumatic power, and/or hydraulic power, for example. The manifold movement mechanisms may be able to linearly move any distance suitable to accomplish aspects provided herein. For example, a distance 318 extends between a midpoint of the first sleeve port 214 and a midpoint of the positive sleeve port 216. To center the inlet port 218 of the first nozzle 210 when maintained in an active position, the manifold movement mechanism 236 moves at least a distance 318, in an exemplary aspect. Stated differently, in an exemplary aspect, the offset distance 316 is at least equal to the distance 318 allowing for an inlet port of a nozzle to be similarly positioned relative to a sleeve port of different manifolds. However, the offset distance 316 may be less than the distance 318 if a consistent relative position of an inlet port to different sleeve ports is not utilized. Further yet, in an exemplary aspect, the manifold movement mechanism is effective to move at least a distance between the seal 226 and the seal 228 to ensure the nozzle is able to fluidly couple with both the vacuum manifold 204 and the positive manifold 206. In an exemplary aspect, the first inlet port 218 is not in fluid communication with the first sleeve port 214 nor the first positive sleeve port 216 when the first nozzle 210 is in an inactive position.

The elements and features of the positive manifold 206 may be similar to those discussed with respect to the vacuum manifold 204, in an exemplary aspect. For example, the first sleeve 212 and the second sleeve 215 may have a similar construction, size, and shape. Further, as previously provided, the opening of the sleeves through which the nozzles extend may be axially aligned for a smooth slideable motion of the nozzle relative to the manifolds.

FIG. 3 depicts a cross sectional view 300 of the pickup tool 102 having the first nozzle 210 in an active position and the second nozzle 211 in an inactive position relative to the vacuum manifold 204, in accordance with aspects hereof. The second nozzle 211 is positioned by the second nozzle movement mechanism 213 at the inactive position represented by the plane 302. In this inactive position, a second inlet port 326 is fluidly decoupled from the second sleeve port 328 by being positioned above a seal defining the top of the second sleeve port 328. As such, the second nozzle 211 is positioned outside of a part contacting plane defined by the active position of plane 304, which reduces interference of the inactive nozzle with the components to be manipulated, in an exemplary aspect.

FIG. 4 depicts a cross sectional view 400 of the pickup tool 102 having the first nozzle 210 in an active position and the second nozzle 211 also in an active position relative to the positive manifold 206, in accordance with aspects hereof. As depicted, the manifolds are repositioned by the manifold movement mechanism 236 such that the inlet port 218 is fluidly coupled with the positive sleeve port 216 allowing for transmission of pressure from the positive manifold 206 through the first nozzle 210. In this example, the manifold movement mechanism 236 linearly moved the manifolds a distance equivalent to the distance 318 allowing for a consistent inlet port position relative to the different manifolds when in the active position. This movement of the manifolds causes a distance between the base plate 202 bottom surface and the plane 306 to reduce to a distance 313, in this example. As previously provided, however, the distance of movement by the manifold movement mechanism 236 may vary while still allowing the effective coupling and decoupling of a nozzle with various manifolds.

FIG. 5 depicts a cross sectional view 500 of the pickup tool 102 having the first nozzle 210 in an active position and the second nozzle 211 in an inactive position relative to the positive manifold 206, in accordance with aspects hereof. As previously discussed with respect to FIG. 4, the manifold movement mechanism 236 repositions the manifolds such that the positive manifold 206 is positioned to be coupled with the first nozzle 210, in this example. Also similar to FIG. 3 in which the second nozzle 211 is positioned in an inactive position at the plane 302 by the second nozzle movement mechanism 213. However, in FIG. 5, the second nozzle is decoupled from the positive manifold 206 where the second inlet port 326 is fluidly decoupled from a positive second sleeve port 327.

Figure 6:
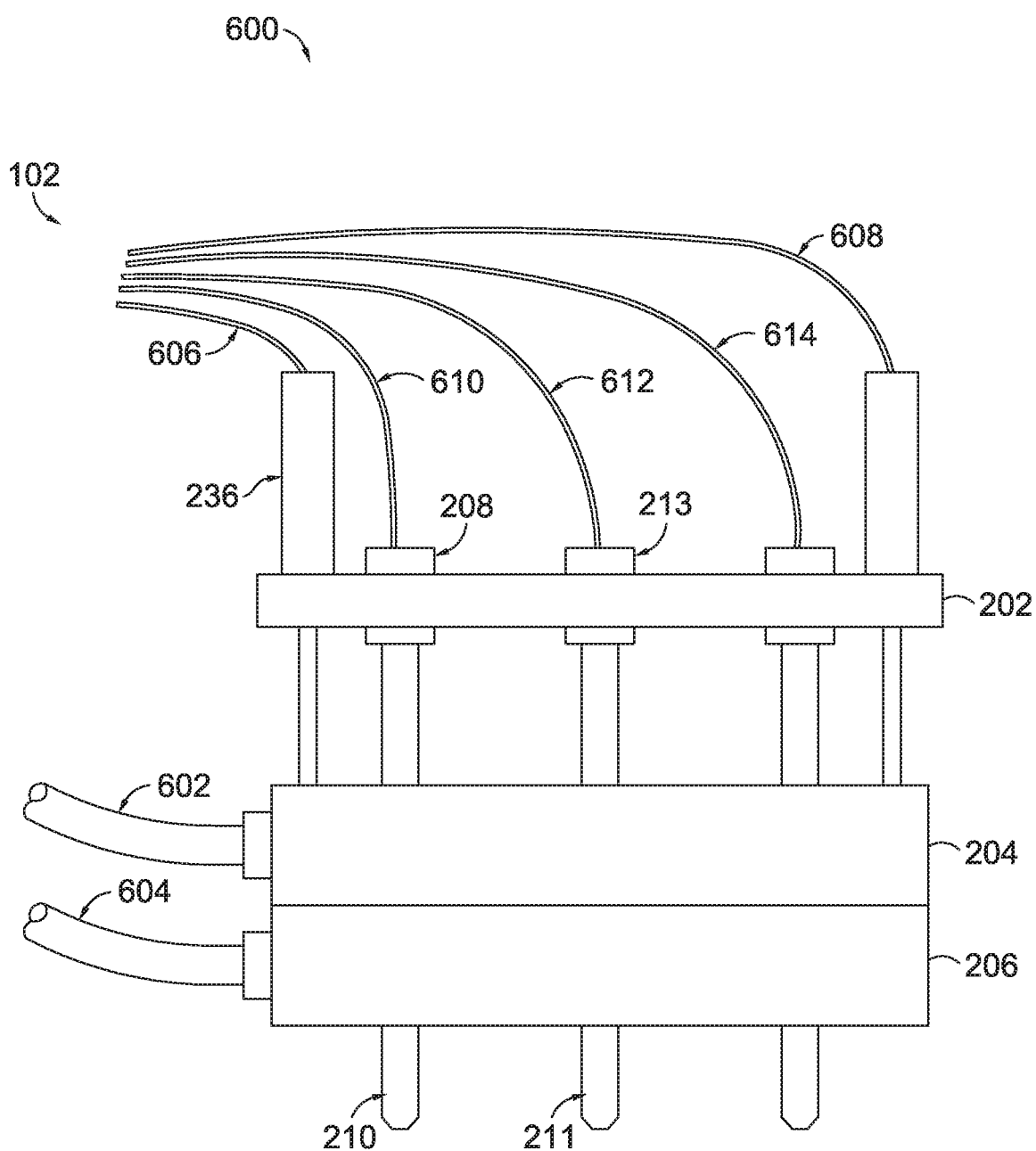
FIG. 6 depicts a side profile view of the pickup tool of FIG. 1, in accordance with aspects hereof.

FIG. 6 depicts a side profile view 600 of the pickup tool 102, in accordance with aspects hereof. As depicted, the first nozzle 210 and the second nozzle 211 extend through the vacuum manifold 204 and the positive manifold 206. A vacuum supply line 602 fluidly couples the vacuum manifold 204 with a vacuum source, such as the vacuum source 106 of FIG. 1. A pressure supply line 604 fluidly couples the positive manifold 206 with a positive pressure source, such as the positive pressure source 108 of FIG. 1. The manifold movement mechanisms are coupled with supply lines 606 and 608 that provide connectivity with a power source, such as a positive pressure source, an electrical controller, or other source. Therefore, the supply lines 606 and 608 may be fluidly or electrically coupled with one or more power sources to cause the movement of the manifold movement mechanisms. Similarly, the nozzle movement mechanisms are coupled with supply lines 610, 612, and 614 that provide connectivity with a power source, such as a positive pressure source, an electrical controller, or other source. Therefore, the supply lines 610, 612, and 614 may be fluidly or electrically coupled with one or more power sources to cause the movement of the nozzle movement mechanisms. It is contemplated that one or more switches, valves, or controllers may be directly or indirectly associated with one or more movement mechanisms and/or supply lines to control associated movements. For example, a computing device may provide instructions to the one or more switches, valves, and/or controllers to regulate and control the distribution of power to the movement mechanisms, in an exemplary aspect.

Figure 7A:
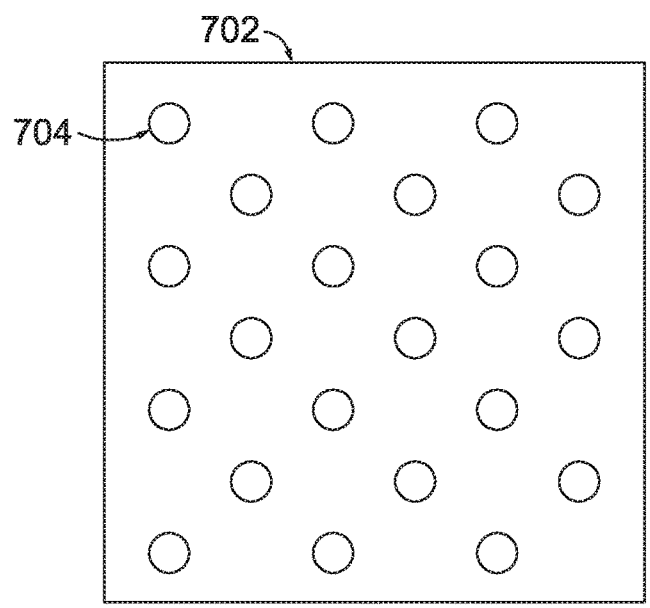
FIGS. 7A-7D depict bottom views of exemplary pickup tools having nozzles positioned in varied numbers and configurations, in accordance with aspects hereof.
Figure 7B:
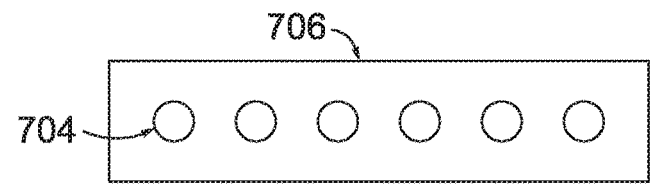
Figure 7C:
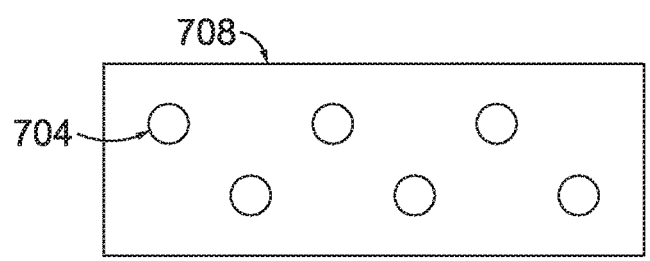
Figure 7D:
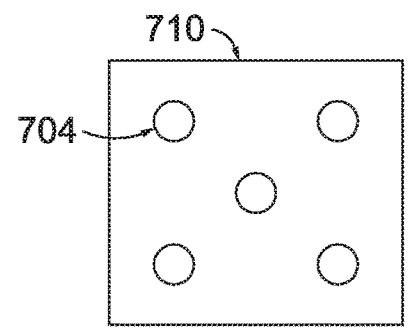

FIGS. 7A-7D depict bottom views of exemplary pickup tools having nozzles 704 positioned in varied numbers and configurations, in accordance with aspects hereof. FIG. 7A depicts a square pickup tool 702 having a staggered distribution of nozzles 704, in accordance with aspects hereof. FIG. 7B depicts a rectangular pickup tool 706 having a linear arrangement of nozzles 704, in accordance with aspects hereof. FIG. 7C depicts another rectangular pickup tool 708 having a staggered arrangement of nozzles 704 in accordance with aspects hereof. FIG. 7D depicts a square pickup tool 710 having limited number of nozzles 704 in a staggered arrangement, in accordance with aspects hereof.

It is contemplated that any number of nozzles, configuration of nozzles, and orientation of nozzles may be implemented. As previously discussed, as many as 300 discrete and individually controllable nozzles may be implemented and as few as 2 discrete and individually controllable nozzles may be implemented in aspects hereof. Further, any shape, such as circular, oval, irregular, rectangular, square, and the like may be implemented as the configuration to which the nozzles are arranged.

Figure 8:
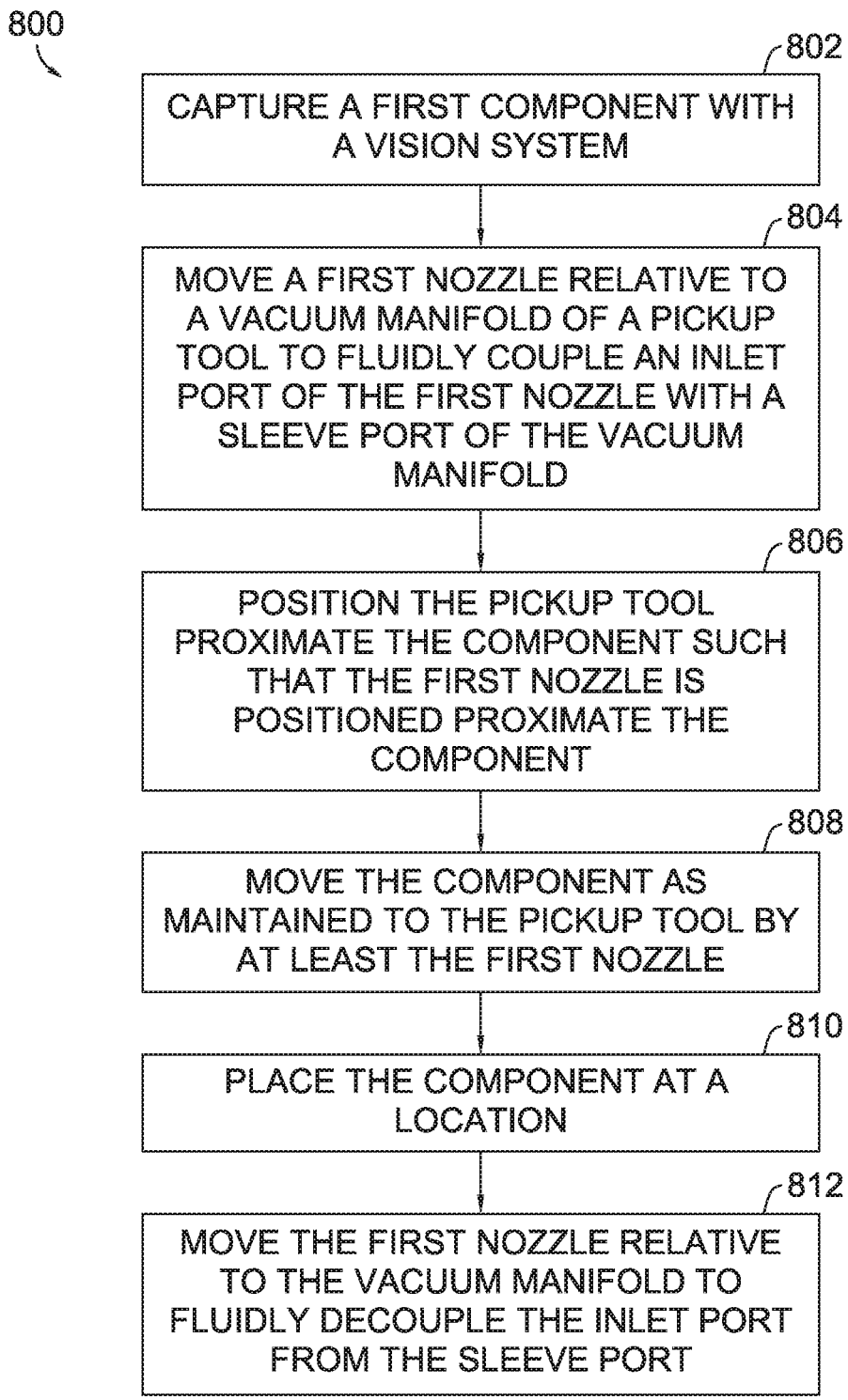
FIG. 8 depicts a flow diagram representing a method for moving material with a pickup tool having individually controlled nozzles, in accordance with aspects hereof.

FIG. 8 depicts a flow diagram representing a method 800 for moving material with a pickup tool having individually controlled nozzles, in accordance with aspects hereof. At a block 802 a first component is captured with a vision system. For example, a component to form an article of footwear may be presented within a field of view of the vision system such that an image is captured from the vision system. This captured image may then be analyzed to determine a component identification and/or orientation. From this determination, the one or more stored instructions may be retrieved that determine which of a plurality of nozzles should be activated for the component. These instructions may be maintained in a computing device controlling the movement and activation of the pickup tool, in an exemplary aspect.

At a block 804 a first nozzle is moved relative to a vacuum manifold of the pickup tool to fluidly couple the first nozzle with a sleeve port of the vacuum manifold. This movement may be accomplished by a nozzle movement mechanism, such as a linear actuator. The selection of the first nozzle to become active may be made by a computing device in response to a known component to be picked up.

At a block 806 the pickup tool is positioned proximate the component such that at least the first nozzle is positioned proximate the component. The positioning of the pickup tool may be accomplished by a multi-axis movement mechanism, such as a robotic arm. The positioning of the pickup tool may be controlled and coordinated by a computing device, in an exemplary aspect.

At a block 808 the component is moved by the pickup tool such that the component is removably adhered to the first nozzle by a vacuum force. The vacuum force is transmitted by the first nozzle as a result of the step in block 804. Additional nozzles of the pickup tool not in an active position (e.g., decoupled from the vacuum manifold) do not removably adhere to the component as they are not transmitting a vacuum pressure and they may be physically recessed from the part-contacting plane, in an exemplary aspect.

At a block 810 the component is placed at a location by the pickup tool. IN an exemplary aspect, the component is re-oriented for another processing step to be performed (e.g., sewing, cutting, adhering, painting, and printing). The component may be stacked or positioned relative to another component in an exemplary aspect at the block 810. The component may be transferred to another processing line or machine at the block 810. In an exemplary aspect, the placing of the component may be accomplished through a blow off of positive pressure by the first nozzle as the associated manifold is changed relative to the first nozzle.

At a block 812 the first nozzle is moved relative to the vacuum manifold to fluidly decouple the inlet port from the sleeve port. For example, a nozzle movement mechanism may reposition the first nozzle such that the inlet port of the first nozzle is outside of the sealed sleeve port of the manifold through which the first nozzle extends. The fluid decoupling stops the continued application of vacuum pressure through the first nozzle to the component, which allows for the termination of the temporary vacuum adhesive between the component and the first nozzle.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A method of moving material with a pickup tool, the method comprising:
   moving a first nozzle of a plurality of nozzles relative to a vacuum manifold of the pickup tool to fluidly couple an inlet port of the first nozzle with a sleeve port of the vacuum manifold;
   positioning the pickup tool such that the first nozzle is positioned proximate a component to be picked up by the pickup tool at a first location;
   moving the component as maintained to the pickup tool by at least the first nozzle;
   placing the component at a second location;
   moving the first nozzle relative to the vacuum manifold to fluidly decouple the inlet port from the sleeve port; and
   moving a positive manifold relative to the first nozzle such that the inlet port of the first nozzle is in fluid communication with a positive sleeve port of the positive manifold.

2. The method of claim 1, further comprising: capturing the component with a vision system prior to positioning the pickup tool proximate the component.

3. The method of claim 2, further comprising:
   prior to moving the first nozzle relative to the vacuum manifold to fluidly couple the inlet port with the sleeve port, determining the first nozzle is to be activated based, in part, on the capturing of the component by the vision system.

4. The method of claim 1,
   wherein the positive manifold is coupled with the vacuum manifold.

5. The method of claim 4, wherein the pickup tool comprises a manifold movement mechanism.

6. The method of claim 5, wherein the manifold movement mechanism is coupled to a base member.

7. The method of claim 5, wherein the manifold movement mechanism is coupled to the vacuum manifold.

8. The method of claim 5, wherein the manifold movement mechanism is coupled to the vacuum manifold and to a base member.

9. The method of claim 4, wherein the moving the positive manifold relative to the first nozzle occurs via movement of a manifold movement mechanism.

10. The method of claim 9, wherein the moving the positive manifold relative to the first nozzle occurs via linear movement of the manifold movement mechanism.

11. The method of claim 1, wherein the moving the first nozzle of the plurality of nozzles relative to the vacuum manifold of the pickup tool occurs via a nozzle movement mechanism.

12. A method of moving material with a pickup tool, the method comprising:
   moving a first nozzle of a plurality of nozzles relative to a vacuum manifold of a pickup tool to fluidly couple an inlet port of the first nozzle with a sleeve port of the vacuum manifold;
   positioning the pickup tool such that the first nozzle is positioned proximate a component to be picked up by the pickup tool at a first location;
   moving the component as maintained to the pickup tool by at least the first nozzle;
   placing the component at a second location; and
   moving a positive manifold relative to the first nozzle.

13. The method of claim 12, wherein the positive manifold is coupled with the vacuum manifold.

14. The method of claim 12, wherein the moving the positive manifold relative to the first nozzle occurs via movement of a manifold movement mechanism.

15. The method of claim 14, wherein the moving the positive manifold relative to the first nozzle occurs via linear movement of the manifold movement mechanism.

\* \* \* \* \*